United States Patent
Kim et al.

(10) Patent No.: US 9,609,681 B2
(45) Date of Patent: Mar. 28, 2017

(54) METHOD AND APPARATUS FOR DISCOVERING TARGET IN DEVICE-TO-DEVICE DIRECT COMMUNICATION

(71) Applicant: Electronics and Telecommunications Research Institute, Daejeon (KR)

(72) Inventors: Soo Chang Kim, Daejeon (KR); Young-Hoon Kim, Daejeon (KR); Seon-Ae Kim, Daejeon (KR); Moon-Sik Lee, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/735,452

(22) Filed: Jun. 10, 2015

(65) Prior Publication Data
US 2016/0113049 A1 Apr. 21, 2016

(30) Foreign Application Priority Data
Oct. 20, 2014 (KR) .................. 10-2014-0142053

(51) Int. Cl.
*H04W 76/02* (2009.01)
*H04W 8/00* (2009.01)
*G06K 9/78* (2006.01)
*G06K 9/00* (2006.01)
*G06K 9/22* (2006.01)
*G06K 9/62* (2006.01)
*H04W 4/02* (2009.01)
*H04W 4/00* (2009.01)

(52) U.S. Cl.
CPC ...... *H04W 76/023* (2013.01); *G06K 9/00624* (2013.01); *G06K 9/22* (2013.01); *G06K 9/6212* (2013.01); *G06K 9/78* (2013.01); *H04W 4/008* (2013.01); *H04W 4/02* (2013.01); *H04W 8/005* (2013.01)

(58) Field of Classification Search
CPC ....... G06K 9/78; H04W 76/023; H04W 8/005
See application file for complete search history.

(56) References Cited

U.S. PATENT DOCUMENTS

| 2011/0016405 A1* | 1/2011 | Grob .................. H04N 1/00127 715/740 |
| 2013/0203448 A1 | 8/2013 | Kang et al. |
| 2013/0204939 A1* | 8/2013 | Yajima .................... H04W 8/24 709/204 |

(Continued)

FOREIGN PATENT DOCUMENTS

KR 1020140117060 A 10/2014

*Primary Examiner* — David Bilodeau
(74) *Attorney, Agent, or Firm* — William Park & Associates Ltd.

(57) ABSTRACT

If a master device in device-to-device direct communication designates an object type of a target to be communicated with, transmits a target discovery request message including the object type of the target to be communicated with to a plurality of neighboring target devices, and receives a target discovery response message from one or more target devices corresponding to the object type of the target to be communicated with among the plurality of target devices, the master device determines one target device among one or more target devices as the target to be communicated with.

18 Claims, 6 Drawing Sheets

(56) References Cited

U.S. PATENT DOCUMENTS

| | | | |
|---|---|---|---|
| 2014/0293809 A1 | 10/2014 | Kim et al. | |
| 2015/0133051 A1* | 5/2015 | Jamal-Syed | H04M 1/7253 |
| | | | 455/41.2 |
| 2016/0037573 A1* | 2/2016 | Ko | G06F 3/013 |
| | | | 455/41.2 |

* cited by examiner

METHOD AND APPARATUS FOR DISCOVERING TARGET IN DEVICE-TO-DEVICE DIRECT COMMUNICATION

CROSS-REFERENCE TO RELATED APPLICATION

This application claims priority to and the benefit of Korean Patent Application No. 10-2014-0142053 filed in the Korean Intellectual Property Office on Oct. 20, 2014, the entire contents of which are incorporated herein by reference.

BACKGROUND OF THE INVENTION (a) Field of the Invention

The present invention relates to a method and an apparatus for discovering a target in device-to-device direct communication, and more particularly, to a method and an apparatus capable of rapidly selecting a target device having a desire to communicate among a large number of surrounding devices.

(b) Description of the Related Art

The majority of mobile services which are currently used have Internet-based communication structure via a base station such as 3G, LTE, and LTE-A or separate access point (AP) equipment such as WiFi AP. In the environment of the majority of mobile services, even in the case in which a simple message is intended to be transmitted to another user in close proximity to a user, since the base station or the AP equipment should be used, a service delay and charging may occur.

Meanwhile, device-to-device direct communication enables direct communication between two devices that are adjacent to each other without using the base station or the AP equipment, and uses communication techniques such as Bluetooth, Wi-Fi, direct near field communications (NFC), and the like. Device-to-device direct communication using NFC and WiFi P2P is broadly used in home appliances and office machines that are recently released as well as mobile devices, and as a result, provides convenient functions capable of controlling the home appliances or the office machines by the mobile devices.

In order to perform the above-mentioned device-to-device direct communication, it is required to discover a desired target device. However, in a wireless communication environment in which a large number of devices are scattered, communication within a close distance has disadvantages that it spends much time in discovering the target device and it may also access only in the case in which it has advance information on the target device. Further, in the future, since it is expected that the device-to-device direct communication will be further activated, the more devices there are, the more difficult the discovery of an accurate target is.

Meanwhile, as a technique for rapidly discovering the target device, a look and link communications method has been used. That is, examples of the look and link communications method for rapidly discovering the target device include a method using an image, a method using a radio wave, and a method using a sound wave. The method using an image is a method of photographing the target device using a camera of a mobile device and determining whether or not the photographed target is the same as a desired target device. The method using a radio wave is a method in which a sharp radio wave beam is transmitted to the target device and the target device receiving the sharp radio wave beam recognizes reception of a connection request from someone and responds to the connection request. The method using a sound wave is a method in which the sound wave instead of the radio wave is used and the target device receiving the sound wave responds. The above-mentioned methods may be solely used and may be used in combination according to the purpose.

Once the look and link communications method is used, the target device may be discovered even in the case in which ID such as an address or number of the target device is not known, and the target device may be discovered within three seconds as compared to a case in which an existing Bluetooth or Wi-Fi Direct takes thirty seconds or more, thereby making it possible to dramatically reduce a time taken to search and discover the device.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for discovering a target in device-to-device direct communication having advantages of dramatically reducing a time taken to discover a target device in the device-to-device direct communication.

An exemplary embodiment of the present invention provides a method for discovering a target to communicate with a master device in device-to-device direct communication. The method includes: designating an object type of the target to be communicated with; transmitting a target discovery request message including the object type of the target to be communicated with to a plurality of neighboring target devices; receiving target discovery response messages from one or more target devices corresponding to the object type of the target to be communicated with among the plurality of target devices; and determining one target device among one or more target devices as the target to be communicated with.

The designating may include: photographing the target to be communicated with; and determining the object type of the target to be communicated with using a photographed image of the target to be communicated with.

The target discovery response message may include an image feature of a corresponding target device, and the determining may include: extracting an image feature of the photographed image of the target to be communicated with; matching the image feature of each target device with the image feature of the target to be communicated with and selecting candidate devices according to matching probability; and determining one target device by a selection of a user among the candidate devices.

The designating may include receiving the object type of the target to be communicated with from a user.

The target discovery response message may include a service which is supportable by a corresponding target device, and the method may further include transmitting a service access request to the target to be communicated with.

The transmitting may include transmitting the target discovery request message using at least one of a radio wave, a beam, and a sound wave.

Another embodiment of the present invention provides a method for responding to a master device discovering a target to be communicated with from one or more target devices in device-to-device direct communication. The method includes: receiving a target discovery request message including an object type of the target to be communicated with from the master device; determining whether or not an object type of the target device corresponds to an object type of the target to be communicated with; and if the object type of the target device corresponds to the object type of the target to be communicated with, transmitting a target discovery response message to the master device.

The target discovery response message may include at least one of the object type and an image feature of a corresponding target device, and possible services.

The determining may include determining whether or not a set object type and the object type of the target to be communicated with are the same.

Yet another embodiment of the present invention provides an apparatus for discovering a target to be communicated with in device-to-device direct communication. The apparatus includes an object filtering unit, a transmitting and receiving unit, and a controlling unit. The object filtering unit may determine an object type of the target to be communicated with. The transmitting and receiving unit may transmit a target discovery request message including the object type of the target to be communicated with and receive a target discovery response message from one or more target devices corresponding to the object type of the target to be communicated with among the plurality of target devices. The controlling unit may determine a target to be communicated with among one or more target devices.

The object filtering unit may photograph the target to be communicated with, and determine the object type of the target to be communicated with using a photographed image.

The target discovery response message may include an object type of a corresponding target device, the controlling unit may verify whether or not the object type within the object discovery response message corresponds to the object type of the target to be communicated with and output a candidate device among one or more target devices through a screen, and the target to be communicated with may be selected by a user.

The target discovery response message may include an image feature of the corresponding target device, and the controlling unit may match an image feature of a photographed image of the target to be communicated with and the image feature of each target device, and select the candidate device according to a matching probability.

The object filtering unit may receive the object type of the target to be communicated with from a user.

DETAILED DESCRIPTION OF THE EMBODIMENTS

Figure 1:
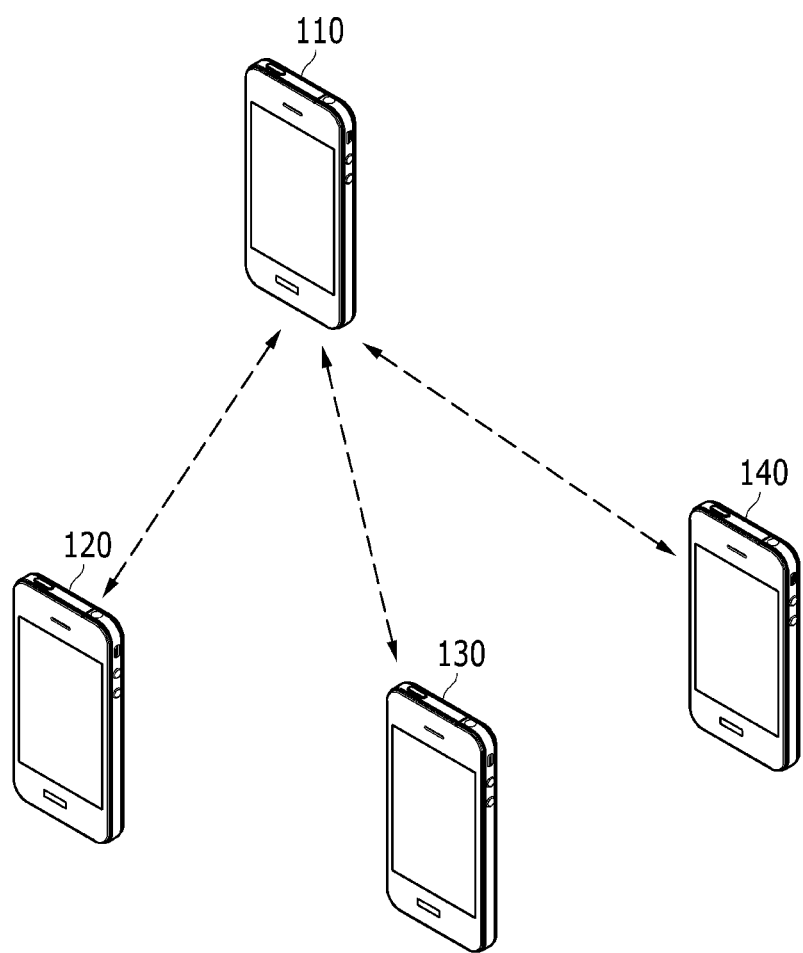
FIG. 1 is a drawing illustrating a concept of device-to-device direct communication according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and the claims, unless explicitly described to the contrary, the word "comprise" will be understood to imply the inclusion of stated elements but not the exclusion of any other elements.

Throughout the specification, a device may be referred to as user equipment (UE), a mobile terminal (MT), a mobile station (MS), an advanced mobile station (AMS), a high reliability mobile station (HR-MS), a subscriber station (SS), a portable subscriber station (PSS), an access terminal (AT), or the like, and may include all or some of the functions of the UE, the MT, the MS, the AMS, the HR-SS, the PSS, the AT, or the like.

Hereinafter, a method and an apparatus for discovering a target device in device-to-device direct communication according to an exemplary embodiment of the present invention will be described in detail with reference to the accompanying drawings.

FIG. 1 is a drawing illustrating a concept of device-to-device direct communication according to an exemplary embodiment of the present invention.

Referring to FIG. 1, a device 110 discovers a communication target device (e.g., 120) among neighboring devices 120, 130, and 140, and directly transmits and receives data to and from the communication target device 120. In this case, for convenience of explanation, the device 110 that discovers a communication target among the devices 110, 120, 130, and 140 is referred to as a master device and the remaining devices are referred to as target devices.

Figure 2:
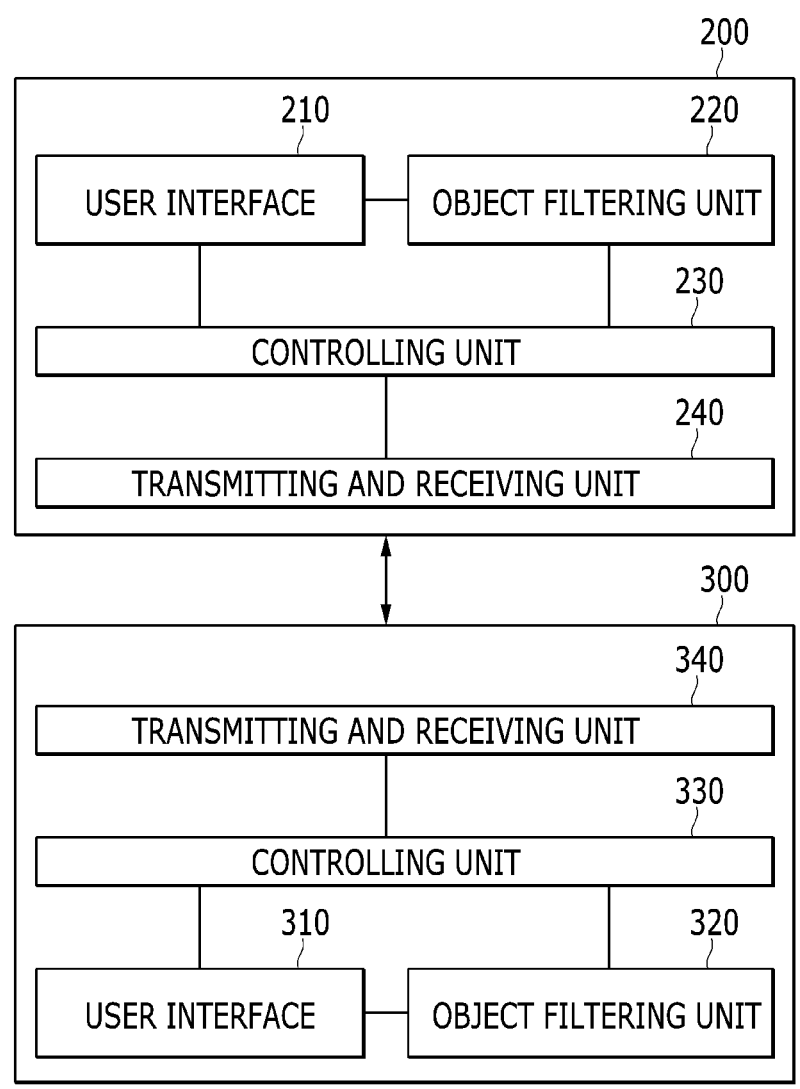
FIG. 2 is a drawing illustrating an apparatus for discovering a target according to an exemplary embodiment of the present invention.

FIG. 2 is a drawing illustrating an apparatus for discovering a target according to an exemplary embodiment of the present invention.

Referring to FIG. 2, an apparatus 200 for discovering a target of the master device 110 includes a user interface 210, an object filtering unit 220, a controlling unit 230, and a transmitting and receiving unit 240. An apparatus 300 for discovering a target of the target devices 120, 130, and 140 includes a user interface 310, an object filtering unit 320, a controlling unit 330, and a transmitting and receiving unit 340.

In an apparatus 200 for discovering the target, the user interface 210 receives and process a selection of a user related to an object filtering function.

The object filtering unit 220 serves to process an object filtering. The object filtering unit 220 segments an object so as to be divided into various groups and determines an object type of the communication target. The object type may include person, a sign, equipment, a sensor, and the like. In this case, the object filtering unit 220 may receive the object type of the communication target from the user through the user interface 210. The object filtering unit 220 may also photograph the communication target, determine the object type of the communication target using a photographed image of the communication object, and receive the object type of the communication target from the user.

The controlling unit 230 generates a target discovery request message including a MAC address of the master device 110 and the object type of the communication target. If the controlling unit 230 receives a target discovery response message from the target devices 120, 130, and 140, it checks object types of the target devices 120, 130, and 140 within the target discovery response message, selects a candidate communication target, and displays the candidate communication target on a screen. In addition, if the communication target is input through the user interface 210, the controlling unit 230 requests service access to the corresponding communication target.

The transmitting and receiving unit 240 transmits the target discovery request message to the target devices 120, 130, and 140 and receives the target discovery response message from the target devices 120, 130, and 140.

In an apparatus 300 for discovering the target, the user interface 310 receives and processes the selection of the user.

The object filtering unit 320 checks whether or not the target devices 120, 130, and 140 correspond to the object type of the communication target that the master device 110 desires.

The controlling unit 330 checks the object type of the communication target within the target discovery request message received from the master device 110 and generates the target discovery response message if the target devices 120, 130, and 140 correspond to the object type of the communication target.

The transmitting and receiving unit 340 transmits the target discovery response message to the master device 110 and receives the target discovery request message from the master device 110.

Figure 3:
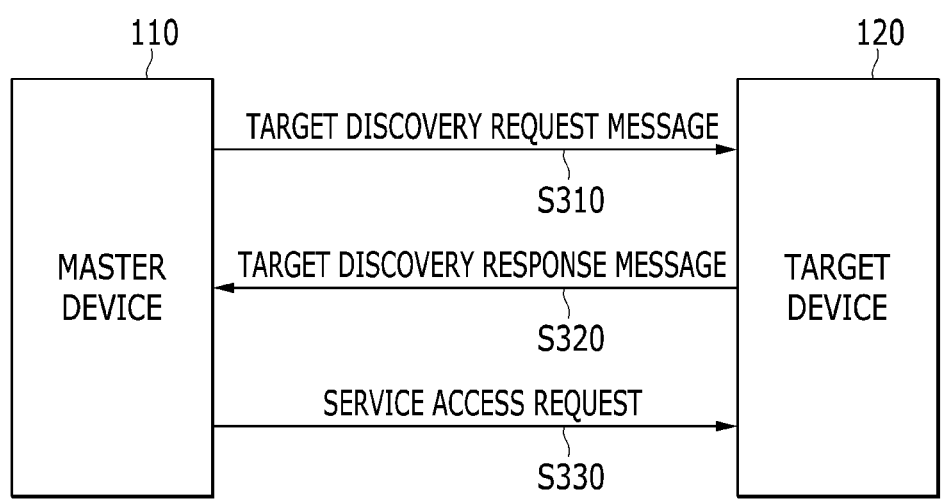
FIG. 3 is a drawing illustrating a device-to-device communication method according to an exemplary embodiment of the present invention.

FIG. 3 is a drawing illustrating a device-to-device communication method according to an exemplary embodiment of the present invention. In FIG. 3, only a single target device 120 is illustrated for convenience for explanation.

Referring to FIG. 3, the master device 110 determines the object type of the communication target that desires to communicate and transmits the target discovery request message including the MAC address of the master device 110 and the object type of the communication target to the target device 120 (S310). The master device 110 may also photograph the communication target, determine the object type of the communication target using a photographed image of the communication object, and receive the object type of the communication target from the user. In addition, the master device 110 may transmit the target discovery request message to the target device 120 using a sharp radio wave beam or sound wave.

If the target device 120 receives the target discovery request message from the master device 110, it checks the object type of the communication target within the target discovery request message and determines whether or not the object type of the target device 120 corresponds to the object type of the communication target. To this end, the target device 120 may prestore its own object type. In addition, the target device 120 may prestore an image feature of a small size in which characteristic image elements are extracted from an own profile picture in order to reduce traffic and determine whether or not the object type of the target device 120 corresponds to the object type of the communication target using the image feature.

If the object type of the target device 120 corresponds to the object type of the communication target, the target device 120 transmits the target discovery response message to the master device 110 (S320). The target discovery response message may include the image feature and the object type of the target device 120, and possible services. Examples of the services may include instant messaging, direct calling, mobile advertisement, picture/music/video sharing services, and the like. In this case, since a response of the target device 120 itself may be considered to be matched to the object type of the communication target that is designated and transmitted by the master device 110, even if the object type of the target device 120 is not included in the target discovery response message, it does not affect its operation.

The master device 110 checks object types of the target devices from the target discovery response messages that are transmitted from several target devices, selects the candidate communication target, and displays the candidate communication target on the screen. In the case in which the master device 110 has an image of the communication target, the master device 110 may match the image of the communication target photographed by the master device 110 with image features transmitted through the target discovery response message transmitted from several target devices and select a target device having highest matching probability as the candidate communication target.

Next, the master device 110 transmits a service access request to one communication target (e.g., 120) selected by the user among the candidate communication targets from the user (S330).

Figure 4:
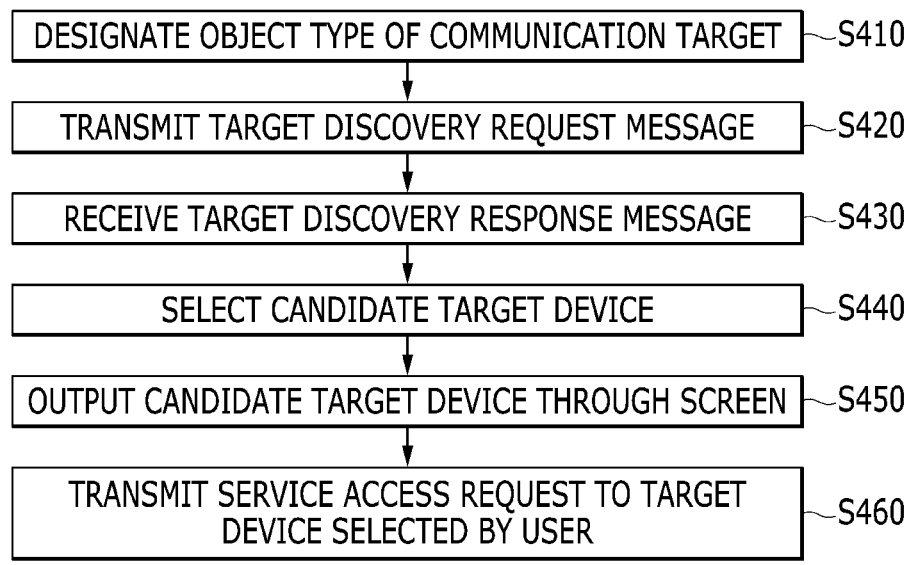
FIG. 4 is a flowchart illustrating a method for discovering a target of a master device according to an exemplary embodiment of the present invention.

FIG. 4 is a flowchart illustrating a method for discovering a target of a master device according to an exemplary embodiment of the present invention.

Referring to FIG. 4, the master device 110 designates the object type of the communication target (S410). In this case, the master device 110 may designate the object type by receiving the object type of the communication target from the user, or determine the object type of the communication target by performing an image processing algorithm or the photographed image of the communication target.

The master device 110 transmits the target discovery request message including a MAC address of the master device 110 and the object type of the communication target to one or more target devices (S420). The master device 110 may transmit the target discovery request message using at least one of the radio wave, the sharp radio wave beam, and the sound wave.

The master device 110 receives the target discovery response message from one or more target devices (S430).

The master device 110 analyzes the object type of each target device from the target discovery response messages received from one or more target devices, and selects one or more candidate target devices S440. In this case, the master device 110 may verity whether the object type of each target device corresponds to the object type of the communication target. In the case in which the image feature of each target device is included in the target discovery response message and has an image of the communication target, the master device 110 may extract the image feature from the image of the communication target, match the image feature of the communication target with the image feature of each target device, and select at least one target device having high matching probability as the candidate target device.

The master device 110 outputs the selected candidate target device on the screen (S450).

The master device 110 transmits the service access request to one target device that is selected by the user (S460).

Figure 5:
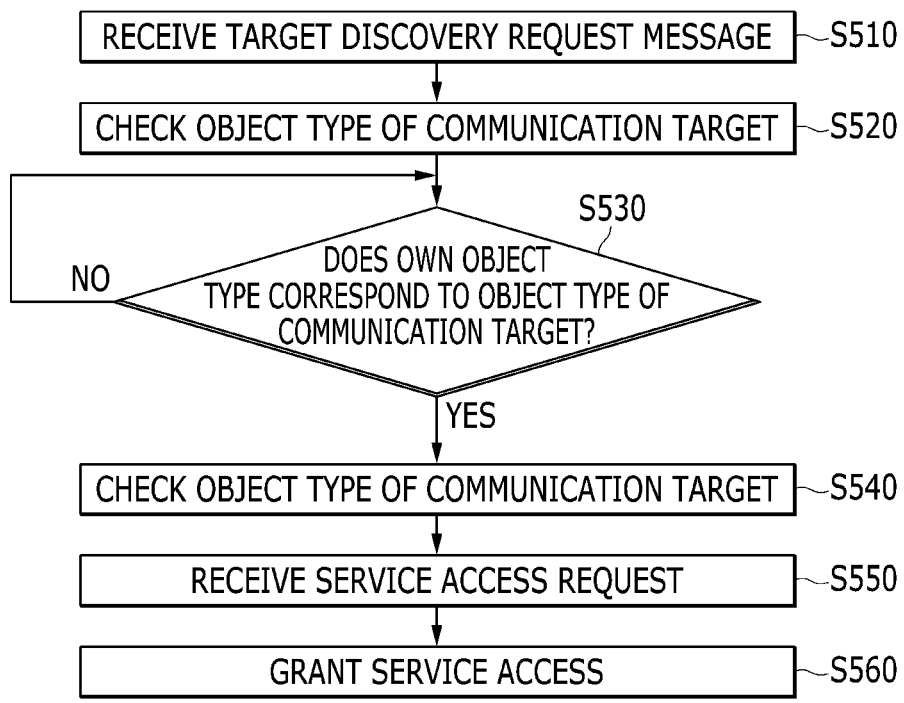
FIG. 5 is a flowchart illustrating a response method in a target device according to an exemplary embodiment of the present invention.

FIG. 5 is a flowchart illustrating a response method in a target device according to an exemplary embodiment of the present invention.

Referring to FIG. 5, if the target device 120 receives the target discovery request message from the master device 110 (S510), the target device checks the object type of the communication target within the target discovery request message (S520).

The target device 120 determines whether the object type of the target device corresponds to the object type of the communication target (S530).

If the target device 120 corresponds to the object type of the communication target within the target discovery request message, the target device 120 generates the target discovery response message including the object type and the image feature of the target device 120, and the possible services, and transmits the target discovery response message to the master device (S540).

If the target device 120 receives the service access request from the master device 110, the target device 120 grants the service access to the master device 110 (S560). In this case, if the target device 120 does not want the service access, the target device 120 may reject the service access.

Figure 6:
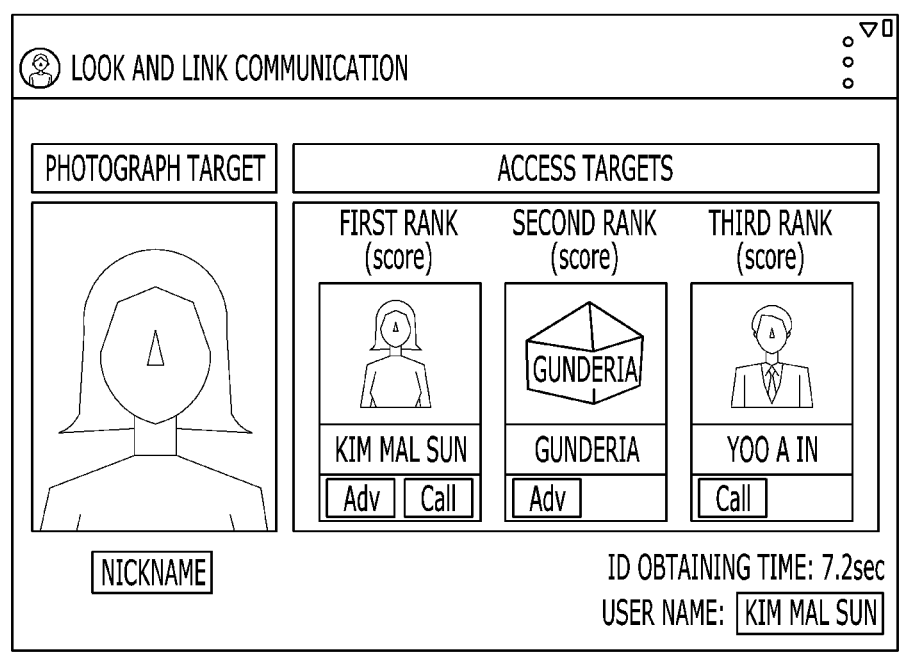
FIG. 6 is a drawing illustrating an example of a screen displayed on the master device according to an exemplary embodiment of the present invention.

FIG. 6 is a drawing illustrating an example of a screen displayed on the master device according to an exemplary embodiment of the present invention.

As illustrated in FIG. 6, the master device 110 photographs a desired communication target on a target photographing screen, and transmits the target discovery request message including the MAC address of the master device 110 and the object type of the communication target.

If the master device 110 receives the target discovery response messages from one or more target devices, the master device 110 matches the image feature within the target discovery response message with the image feature of the photographed image of the communication target, selects the candidate target device having a high matching probability, and displays the candidate target device on the screen. In FIG. 3, three candidate target devices are illustrated.

The user selects the communication target that the user desires among the candidate target devices. Then, the master device 110 transmits the service access request to the communication target that is selected by the user.

According to an embodiment of the present invention, when the communication target is selected using a photographed image of the communication target or the communication target is searched using the radio wave or the sound wave, an unnecessary communication amount may be reduced by an object filtering depending on an object type of the communication target and the communication target may be rapidly discovered.

The above-mentioned exemplary embodiments of the present invention are not embodied only by the apparatus and method as described above. Alternatively, the above-mentioned exemplary embodiments may be embodied by a program performing functions which correspond to the configuration of the exemplary embodiments of the present invention or a recording medium on which the program is recorded. These implementations can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for discovering a target to communicate with a master device in device-to-device direct communication, the method comprising:
    designating an object type of the target to be communicated with;
    transmitting a target discovery request message including the object type of the target to be communicated with to a plurality of neighboring target devices;
    receiving target discovery response messages from one or more target devices corresponding to the object type of the target to be communicated with among the plurality of target devices; and
    determining one target device among one or more target devices as the target to be communicated with.

2. The method of claim 1, wherein the designating includes:
    photographing the target to be communicated with; and
    determining the object type of the target to be communicated with using a photographed image of the target to be communicated with.

3. The method of claim 2, wherein the target discovery response message includes an image feature of a corresponding target device, and
    the determining includes:
    extracting an image feature of the photographed image of the target to be communicated with;
    matching the image feature of each target device with the image feature of the target to be communicated with and selecting candidate devices according to matching probability; and
    determining one target device by a selection of a user among the candidate devices.

4. The method of claim 1, wherein the designating includes receiving the object type of the target to be communicated with from a user.

5. The method of claim 1, wherein the target discovery response message includes a service which is supportable by a corresponding target device, and the method further includes transmitting a service access request to the target to be communicated with.

6. The method of claim 1, wherein the transmitting includes transmitting the target discovery request message using at least one of a radio wave, a beam, and a sound wave.

7. The method of claim 1, wherein receiving by the master device at least one target discovery response message not including the object type of the target means that the object type of the target sent in the target discovery request message matches the object type of the target to be communicated with.

8. The method of claim 1, wherein the target discovery response message includes the object type of the target to be communicated with, an image feature of a corresponding target device, and services supported by the target device.

9. The method of claim 1, wherein the object type includes at least one of a person, a sign, equipment, a sensor.

10. A method for responding to a master device discovering a target to be communicated with from one or more target devices in device-to-device direct communication, the method comprising:

receiving a target discovery request message including an object type of the target to be communicated with from the master device;

determining whether or not an object type of the target device corresponds to an object type of the target to be communicated with; and if the object type of the target device corresponds to the object type of the target to be communicated with, transmitting a target discovery response message to the master device.

11. The method of claim 10, wherein the target discovery response message includes at least one of the object type and an image feature of a corresponding target device, and possible services.

12. The method of claim 11, wherein the services include instant messaging, direct calling, mobile advertisement, picture/music/video sharing.

13. The method of claim 10, wherein the determining includes determining whether or not a set object type and the object type of the target to be communicated with are the same.

14. An apparatus for discovering a target to be communicated with in device-to-device direct communication, the apparatus comprising:

an object filtering unit determining an object type of the target to be communicated with;

transmitting and receiving unit transmitting a target discovery request message including the object type of the target to be communicated with and receiving a target discovery response message from one or more target devices corresponding to the object type of the target to be communicated with among a plurality of target devices; and a controlling unit determining a target to be communicated with among one or more target devices.

15. The apparatus of claim 14, wherein the object filtering unit photographs the target to be communicated with and determines the object type of the target to be communicated with using a photographed image.

16. The apparatus of claim 14, wherein the target discovery response message includes an object type of a corresponding target device, the controlling unit verifies whether or not the object type within in the object discovery response message corresponds to the object type of the target to be communicated with and outputs a candidate device among one or more target devices through a screen, and the target to be communicated with is selected by a user.

17. The apparatus of claim 14, wherein the target discovery response message includes an image feature of the corresponding target device, and the controlling unit matches an image feature of a photographed image of the target to be communicated with and the image feature of each target device, and selects the candidate device according to a matching probability.

18. The apparatus of claim 14, wherein the object filtering unit receives the object type of the target to be communicated with from a user.

\* \* \* \* \*